Patented Jan. 6, 1942

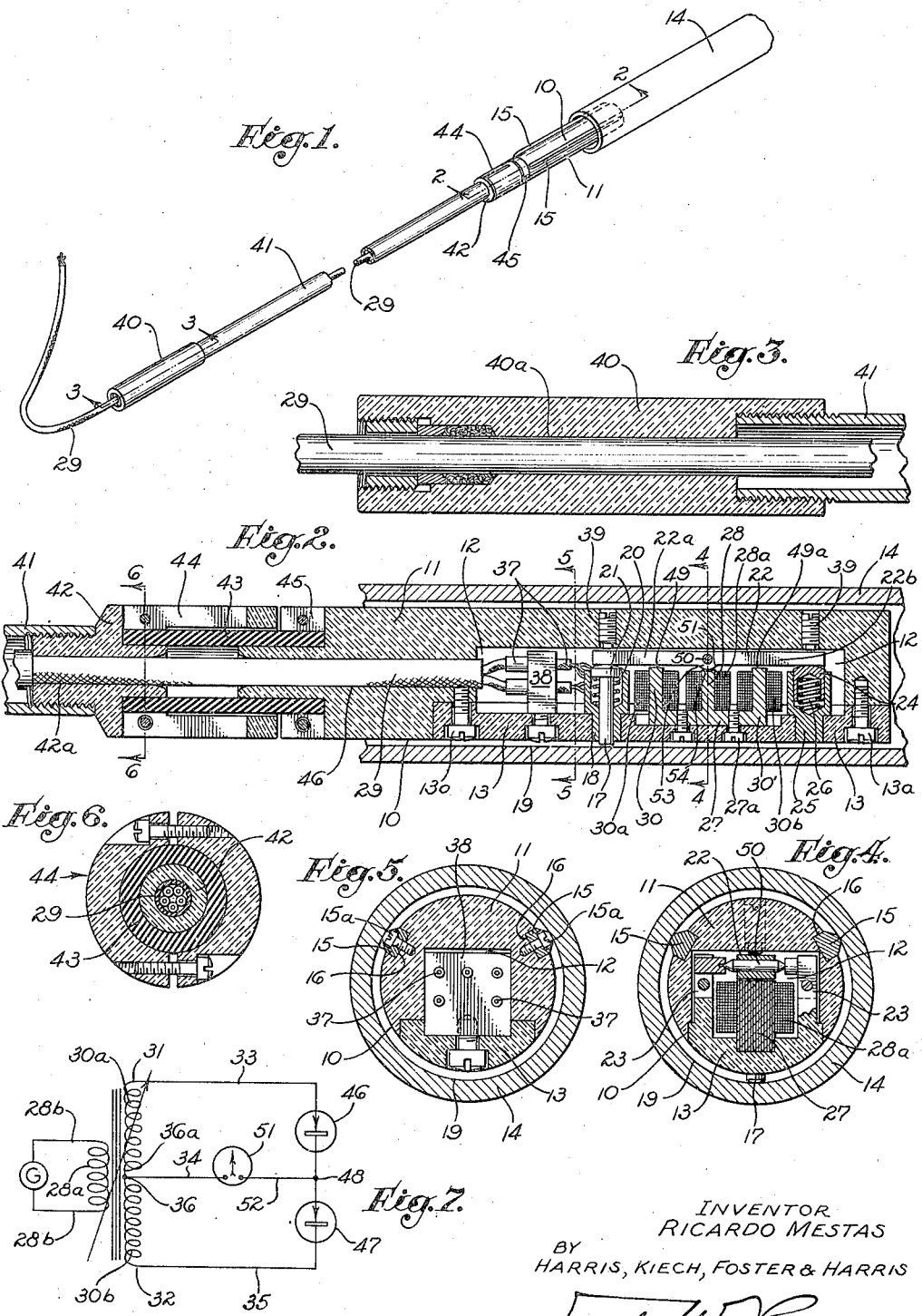
Jan. 6, 1942.   R. MESTAS   2,268,956
ELECTRIC GAUGE
Filed Sept. 14, 1937
INVENTOR
RICARDO MESTAS
BY
HARRIS, KIECH, FOSTER & HARRIS
ATTORNEYS.

2,268,956

UNITED STATES PATENT OFFICE 2,268,956

ELECTRIC GAUGE

Ricardo Mestas, Los Angeles, Calif., assignor to Kobe, Incorporated, Huntington Park, Calif., a corporation of California Application September 14, 1937, Serial No. 163,807

13 Claims. (Cl. 33—178)

This invention relates to electric gauges. Present day manufacturing methods require a high degree of precision in the machining of parts of fabricated articles. A satisfactory gauge must not only accurately respond to extremely small deviations in dimension, but such deviations must be amplified and visually indicated to the operator. And the gauge for practical success must be simply and inexpensively constructed, and compact and convenient to apply to the object gauged.

An object of my invention is to provide a gauge with these qualities of accuracy, sensitiveness, economy of cost, compactness and convenience. The gauge is of the electric type and utilizes the mechanical movement of a gauge element as it follows the surface to be gauged to vary the air gap of a magnetic circuit, which in turn causes variations in an induced current, which variations can be accurately indicated by a suitable meter.

One of the objects of my invention is to provide electrical apparatus which will amplify and accurately indicate the deviations in dimension of the gauged object, and which at the same time will comprise a minimum of electrical elements of simple and standard construction.

Another object is to provide an electrical apparatus which will measure the electric potential of alternating current coils by a direct current galvanometer, so as to secure the advantage of directional indications and a high degree of sensitiveness of this type of potential meter.

Another object of my invention is to provide an arrangement of electrical devices which will measure deviations in dimension of the gauged object without being affected by incidental variations in voltage of the current from the source of supply.

Another purpose is to provide such an arrangement of electrical elements that a varying potential may be produced by a few small parts conveniently located in a small housing which may be applied in restricted spaces.

Another object is to provide a gauge housing which will be small, will have suitable mounting of the electrical and mechanical parts, and which will protect these parts from mechanical injury and from dirt and other foreign matter.

Another object is to provide for ready assembly and dismantling of the electrical and mechanical parts, and for convenient accessibility for their inspection and repair.

Still another object is to afford a gauge which may be readily inserted within the internal bore of long casings and other cylindrical objects of which it is desired to gauge the internal dimensions.

Another object is to provide in a gauge an arrangement and combination of movable and stationary work-contacting parts which will accurately follow and indicate variations in the internal diameter of a hollow cylindrical object, with means for amplifying and visually indicating these variations.

Another advantage of my invention lies in the construction and arrangement of parts by which I utilize pieces of standard pipe for rendering the gauge capable of insertion within tubular objects of relatively great length, and by which the conductor wires of an electric gauge may be disposed in protected positions within the pipe and other gauge parts.

The drawing and description are of one embodiment of my invention. They illustrate and describe a gauge for measuring the internal diameter of cylindrical casings, sleeves or tubing such as are used in the manufacture, among other things, of pumps, and which must be machined with a high degree of accuracy and a minimum of tolerance. It will, however, be readily appreciated that by obvious alterations in the design of the gauge housing and gauge element, some of the principles of my invention, as outlined in some of the claims, can be embodied in a gauge for measuring the external diameter of tubing or pipes, as well as in gauges of many kinds for detecting deviations in plane surfaces, and for measuring the thickness and other dimensions of fabricated parts.

In the drawing, Fig. 1 is a perspective view of a gauge embodying my invention.

Fig. 2 is a longitudinal cross sectional view taken along the line 2—2 of Fig. 1.

Fig. 3 is a longitudinal cross sectional view of the gauge handle taken along the line 3—3 of Fig. 1.

Fig. 4 is a cross sectional view along the line 4—4 of Fig. 2.

Fig. 5 is a cross sectional view along the line 5—5 of Fig. 2.

Fig. 6 is a cross sectional view along the line 6—6 of Fig. 2.

Fig. 7 is a digram of the electrical circuits of the gauge.

A gauge cylindrical body 11 is formed with an internal chamber 12 which is rectangular in cross section, and closed at its open side by a tight-fitting cover 13 which is removably secured to the body by screws 13a. The arcuate external face of this cover forms with the body 11 an elongated cylindrical housing 10 (Fig. 1) adapted to be inserted within a piece of cylindrical tubing 14, to be gauged. The body and cover form a dirt proof housing for the mechanically movable parts and the electromagnetic elements of the gauge.

Two elongated guide lugs or shoes 15 are rigidly secured by screws 15a in two grooves 16 formed longitudinally in the exterior wall of the body at an angular interval of about 120 degrees from each other. A movable gauge element or work contacting member is formed by a plunger 17 slidably mounted in a sleeve 18 which is rigidly secured to the cover 13, and this plunger is disposed in a radial plane angularly midway between the guide shoes 15. This plunger is reciprocally movable longitudinally along a radial line of the gauge housing 11, and is thus moved by variations in the bore diameter of the tubing 14 or by elevations or depressions in the internal face 19 of the tubing.

A spring 20, seated in a recess in the sleeve 18, bears upon the lower face of a rounded inner head 21 of the plunger 17, and holds it at all times resiliently in contact with the under face of one end 22a of an electromagnetic armature 22. This armature comprises a movable element pivotally mounted within the chamber 12 between two inwardly extending arms 23 of the cover 13, so that it is free to oscillate with a slight movement when such movement is imparted to it by the plunger 17. By this construction, the plunger or gauge element and the armature are placed in mechanically operative relationship. The under side of the other end 22b of the armature has a bearing engagement with a hollow cylindrical plunger 24 slidably mounted in a sleeve 25 which is rigidly secured to the cover 13, all in a manner similar to the assembly of the plunger 17, and similarly provided with a spring 26 tending to elevate the plunger 24, which is held in constant resilient contact with the armature end 22b. The spring 26 being of greater strangth than spring 20 acts to hold the guide shoes 15 and plunger 17 in constant sliding contact with the internal wall of the tubing or sleeve to be gauged, overcoming the gravity effect of the weight of the gauge when it is used horizontally and with the movable plunger 17 disposed at the bottom of the gauge. At the same time the action of the spring 20 permits the plunger 17 to rise and fall with variations in the diameter of the tested article, and thereby to slightly oscillate the armature 22. The plungers 17 and 24 tend to move the armature in opposite directions of rotation. Adjustable threaded stops 39, mounted in the body 11, serve to limit the movement of the armature.

A laminated magnetic core 27 with the general configuration or shape of a capital letter E is fastened by screws 27a to the inner wall of the cover 13. About the middle leg 28 of this core is disposed a primary coil 28a connected with a source of alternating current through conductors 28b in a cable 29 as shown diagrammatically in Fig. 7. The two outside legs, 30, 30', of the core are surrounded respectively by two identically formed secondary coils 30a, 30b connected additively in series with each other. The core and primary and secondary coils constitute a three pole electromagnet, and the two secondary coils in cooperation with the primary coil, when the latter is energized, constitute two sources of electric potential. Three conductors, 33, 34 and 35, lead from these secondary coils through the cable 29 to the outside. Conductor 33 is connected to the outer terminal 31 of one coil; conductor 35 is connected to the outer terminal 32 of the other coil, and conductor 34 is connected at 36 to the conductor 36a, which is the series connection between the two secondary coils. To obviate tensile stress upon the conductor leads, they are secured to terminals 37 retained by an insulating conductor terminal plate 38 mounted upon the inner wall of the cover 13.

The armature 22 is formed with a downwardly projecting arcuate boss 53, with its rounded lower face 51 concentric with a pivot pin 50 upon which it is mounted. The axis of this pin is immediately above and in the transverse central plane of the core leg 28, which is formed at its upper end with a mating arcuate surface 54, which preferably contacts or nearly contacts the surface 53. The axis of the pin is also perpendicular to the central longitudinal plane of the core base and legs. By virtue of this mounting of the armature, the air gap between the core leg and the central portion of the armature throughout its range of oscillatory movement is either of zero or a very small and constant magnitude.

A handle 40 formed with a bore 40a therethrough is threadedly secured to a pipe 41 of any desired length, depending upon the length of the tubing or casing to be gauged, which pipe is in turn threadedly engaged with a handle connector 42. This connector is joined to the gauge body 11, by means of a flexible pipe or tube 43 to which the connector and body are both secured by clamps 44 and 45 respectively. The conductor cable 29 leads from the conductor terminal plate 38 in the chamber 12 through a longitudinal axial bore 46 formed in the body 11 and communicating with the chamber 12, then through the flexible tube 43, and a similar bore 42a in the connector 42, then through the pipe 41 and bore 40a in handle 40, to the source of current and to the indicating apparatus. These several bores and tube and pipe openings are in continuous and successive registry.

Referring again to Fig. 7, the five conductor wires of the cable are indicated by the numerals 28b, 28b, 33, 34 and 35. Between conductors 33 and 35 are connected two half-wave rectifiers 46 and 47 of equal impedance, with the anode of rectifier 46 connected by a series connection 48 to the cathode of rectifier 47. Conductor 34 leads from the secondary coil series connection 36a at 36 to a sensitive galvonometer 51 and conductor 52 leads thence to the series connection 48 between the two rectifiers.

In the operation of the measuring device, the gauge body is inserted within the casing, tubing or other cylindrical work object to be measured. When, as normally, the internal diameter of the work is correct, the air gap 49, between the armature end 22a and the leg 30 of the E-shaped core 27, is equal to the air gap 49a between the armature end 22b and the leg 30'. The electromotive force induced in secondary coil 30a is then equal to that induced in secondary coil 30b. Since the rectifiers 46 and 47 are electric devices of equal impedance, the potential at 36 is equal to that at 48 and no current flows through the galvanometer, which indicates a zero reading. When, however, the plunger 17 moves outwardly, gap 49 is decreased, gap 49a is correspondingly increased, and the magnetic flux set up by the primary coil 28a through the middle core leg 28, core base, core leg 30 and armature end 22a is greater than that set up through the middle core leg 28, core base, core leg 30′ and armature end 22b, in accordance with the well known principle that the reluctance of a magnetic circuit varies directly with the length of the air gap or gaps in the circuit. Since induced electromotive force varies directly with the magnetic flux, the induced electromotive force in secondary coil 30a is then greater than that in coil 30b. Since there has been no change in the relative impedance of the rectifiers, a difference in potential then exists between points 48 and 36 and a small current flows through the galvanometer. By reason of the action of the rectifiers, this current is direct current, and as direct current galvanometers are very sensitive, I gain the objective of a high degree of amplification through the use of the rectifiers. These rectifiers 46 and 47 perform a double function in the operation of the gauge. They each provide impedance in that they afford internal resistance to the flow of current in the direction in which they are designed to permit such current flow. They also prevent any flow of current in the opposite direction, with the result that the current flowing through them is a direct current with a potential which varies from zero to a maximum with the same frequency as the alternating current impressed upon the primary. Since they are connected anode to cathode, there is a pulsating flow of current through both of them from terminal 31 to terminal 32 and always in that same direction. Since the internal resistances of the two rectifiers bear a constant ratio to each other, which in the embodiment shown and described herein is equality, and since this ratio of resistances is the same as the ratio of potentials normally generated in the secondaries 30a and 30b, it is obvious that when the ratio of these two potentials varies from the normal, the current which passes through rectifier 46 is either more or less than the current which passes through rectifier 47, and the difference is represented by the current which flows through wires 34 and 52 and the galvanometer 51, which may be in either direction, depending upon which of the coils 30a and 30b generates the greater potential. It is obvious that the indicator needle of the galvanometer records the extent of the movement of the plunger 17, and it is a simple matter of calibration to design the mechanism to indicate in linear units the exact measurement of the movement of the plunger. When the plunger moves inwardly, an opposite set of conditions causes the galvanometer needle to move in the opposite direction. The armature 22 thus acts as a means for unbalancing the potential applied across the galvanometer terminals.

It has already been pointed out that the mechanical features of the gauge can be modified without departing from the principle of my invention. It is also apparent that modifications can be made in the electrical and magnetic features of the device within the scope of my invention. For example, instead of passing alternating current through the primary coil to energize the secondaries, the primary coil may be connected to a source of any other type of pulsating current or current of rapidly varying potential. Thus, direct current in combination with an interrupter may be used. In such case, the rectifiers may be replaced with some other form of impedance.

I have described the secondary coils 30a and 30b as identical and therefore in conjunction with the energized primary coil 28a, these coils are sources of normally equal potential. And, I have described the rectifiers as having the same impedance relative to each other. It is apparent, however, that if the two secondary coils are designed to normally impress two electric potentials bearing to each other any other definite ratio than equality, and the two rectifiers are designed to have impedance values bearing to each other the same definite ratio as that of the normally impressed potentials, the gauge will operate as before and it is to be understood that equality of potential and impedance is used only as one possible, convenient and preferred illustration of such a definite ratio.

It is also apparent that if I provide means for varying the impedance of the circuit between the points 31 and 48 of Fig. 7, relative to the impedance between points 48 and 32, instead of providing means for varying the relative potentials of coils 30a and 30b, the gauge will operate properly and that it is within the scope of my invention to vary either the relative potential or relative impedance which in either case will vary the effective potential between series connections 36a and 48. It will also be observed that no means is provided for varying the impedance in the galvanometer connections 34 and 52, and that the impedance between points 36 and 48 through the galvanometer is always the same.

There are a number of electrical measuring gauges which depend upon the variation of a magnetic circuit when the length of the air gap in the circuit is varied. Most of these instruments measure the change in a field of a coil when the reluctance of the magnetic circuit is varied by a changing air gap. A constant alternating current potential is applied to the coil and the current which flows through the coil will then be a function of the air gap. Any variation of the applied electromotive force also varies the current with no change in air gap so that a device of this kind in order to function satisfactorily must be supplied with a source of potential which is extremely constant. For use on ordinary lighting circuit this requires some form of voltage regulator ahead of the instrument.

A gauge constructed in accordance with my invention avoids the necessity of such a voltage regulator. This is accomplished by utilizing a single primary coil to energize two secondary coils arranged in a bridge circuit of such a character that variations of the dimension of the gauged object vary the ratio of the two potentials generated in the two secondary coils. I provide a suitable meter for measuring this variation of ratio of the two potentials. It is obvious that if the potential applied to the primary coil is increased or decreased, the two potentials generated in the two secondary coils, respectively, will increase and decrease correspondingly but, other factors being unchanged, the ratio between these two potentials will remain constant and such variation in the potential applied to the primary coil will not be indicated by the meter.

I claim as my invention:

1. In an electric measuring device: a source of current of rapidly varying potential; a primary coil electrically connected to said source; two secondary coils arranged to have induced therein by said primary coil electric potentials of normally equal magnitude; a first series connection connecting said secondary coils additively in series relationship; two electric devices of substantially equal impedance; a second series connection connecting said electric devices in series relationship; means for connecting the series connected secondary coils across the series connected electric devices; a potential meter electrically connected between the said series connections; and a mechanically movable element for unbalancing the potentials across said secondary coils by changing in opposite directions the reluctance of both flux paths respectively linking said secondary coils with said primary coil.

2. In an electric measuring device, the combination of: a primary winding adapted to be energized by a constant-frequency alternating potential; two secondary windings inductively coupled to said primary winding whereby constant-frequency potentials are induced therein having normally a definite ratio with respect to each other; a first series connection connecting said secondary windings additively in series relationship; two asymmetrical impedances of impedance magnitudes normally having to each other substantially the same definite ratio as that of said potentials of said secondary windings; a second series connection connecting said asymmetrical impedances together in series relationship; means for connecting the series-connected secondary windings across the series-connected asymmetrical impedances; a potential-responsive means electrically connected between said first and second series connections; and means for varying one of said ratios with respect to the other.

3. In an electric measuring device, the combination of: a primary winding adapted to be energized by a constant-frequency alternating potential; two secondary windings inductively coupled to said primary winding whereby constant-frequency potentials are induced therein when said primary winding is energized; means for simultaneously increasing and decreasing respectively the magnetic coupling of said two secondary windings relative to said primary winding whereby the induced potential in one secondary winding increases while the induced potential in the other secondary winding decreases; a first series connection connecting said secondary windings in series relationship; two rectifiers; a second series connection connecting said rectifiers in series relationship; means for connecting the series-connected secondary windings across the series-connected rectifiers; and a potential-responsive means electrically connected between said first and second series connections.

4. In an electric measuring device, the combination of: a primary winding adapted to be energized by a constant-frequency alternating potential; two matched secondary windings each inductively coupled to said primary winding whereby constant-frequency potentials of substantially equal magnitude are normally induced therein when said primary winding is energized; a first series connection connecting said secondary windings additively in series relationship; two rectifiers of the half-wave type, said rectifiers being substantially of equal impedance; a second series connection connecting said two rectifiers in series circuit in such manner that each rectifier passes current flowing in the same direction; means for connecting the series-connected secondary windings across the series-connected rectifiers; a galvanometer electrically connected between said first and second series connections; and means for simultaneously increasing and decreasing respectively the magnetic coupling of said two secondary windings relative to said primary winding whereby the induced potential in one secondary winding increases while the induced potential in the other secondary winding decreases to cause a change in the reading of said galvanometer.

5. In an electric measuring device, the combination of: a primary winding; two secondary windings; a magnetic core including a movable element for inductively linking said two secondary windings with said primary winding whereby movement of said movable element will increase the flux linkages of one secondary winding while decreasing the flux linkages of the other secondary winding; a first series connection connecting said secondary windings additively in series relationship; two half-wave rectifiers; a second series connection connecting said two rectifiers in series circuit, both rectifiers being connected to pass current in the same direction through said series circuit; means for connecting the series-connected secondary windings across the series-connected rectifiers; and a direct-current galvanometer connected between said first and second series connections.

6. In an electric measuring device including a gauge body and a gauge element movable relative to said body, the combination of: a primary winding in said gauge body; conductor means extending to said gauge body from a remote point to energize said primary winding; two secondary windings inductively coupled to said primary winding; a first series connection in said gauge body for connecting said secondary windings additively in series relationship; means for varying the inductive coupling of each secondary winding relative to said primary winding in response to changes in the measurement to be taken; two conductors extending from said remote point to the two remaining terminals of said series-connected secondary windings; two rectifiers at said remote point; means for connecting said rectifiers in series relationship, anode to cathode, between said two conductors; a galvanometer at said remote point; means for connecting one terminal of said galvanometer to the common terminals of said rectifiers; and conductor means extending from the other terminal of said galvanometer to said first series connection.

7. In an electric measuring device, the combination of: an E-shaped electromagnetic core; an armature pivoted adjacent the end of the central leg of said core in such manner that its ends move toward and away from the outside legs of said core when said armature is pivoted whereby the air gap adjacent one outside leg increases while the air gap adjacent the other outside leg decreases; a primary winding on the central leg of said core; two secondary windings, one on each of the outside legs of said core to receive an amount of flux which varies with slight changes in pivotal movement of said armature; a first series connection for connecting said secondary windings additively in series relationship; two rectifiers; a second series connection for connecting said two rectifiers in series circuit, both rectifiers being connected to pass current in the same direction through said series circuit; means for connecting the series-connected secondary windings across the series-connected rectifiers; and a potential-responsive meter electrically connected between said first and second series connections.

8. In an electric measuring device, the combination of: an E-shaped electromagnetic core;

an armature adjacent the end of the central leg of said core and providing ends extending to a position adjacent the outside legs of said core; means for movably mounting said armature in such manner that its ends move respectively toward and away from said outside legs of said core to respectively decrease and increase the reluctance of flux paths traversing said armature and said outside legs; windings disposed respectively on each of the outside legs of said core; a first series connection for connecting said windings in series relationship; means for energizing said windings from a source of current of rapidly-varying potential to produce potential differences between the terminals of each winding, said potentials varying with respect to each other in response to a relative change in reluctance of said flux paths; two rectifiers; a second series connection for connecting said two rectifiers in series circuit, both rectifiers being connected to pass current in the same direction through said series circuit; means for connecting the series-connected rectifiers across the series-connected windings; and a potential-responsive meter electrically connected between said first and second series connections.

9. In an electric measuring device, the combination of: armature means and core means providing two variable-reluctance flux paths; means for movably mounting said armature means in such manner that movement of said armature in one direction increases the reluctance of one flux path and relatedly decreases the reluctance of the other flux path, while movement of said armature means in an opposite direction decreases the reluctance of said one flux path and relatedly increases the reluctance of said other flux path; windings respectively linking said flux paths; a first series connection for connecting said windings in series relationship; means for energizing said windings from a source of current of rapidly-varying potential to produce potential differences between the terminals of each winding, said potentials varying with respect to each other in response to a relative change in reluctance of said flux paths; two rectifiers; a second series connection for connecting said two rectifiers in series circuit, both rectifiers being connected to pass current in the same direction through said series circuit; means for connecting the series-connected rectifiers across the series-connected windings; and a potential-responsive meter electrically connected between said first and second series connections.

10. In an electric measuring device, the combination of: means providing two flux paths of variable reluctance; means for increasing the reluctance of one flux path while relatedly decreasing the reluctance of the other flux path in response to a decrease in the measurement to be taken and for decreasing the reluctance of said one flux path while relatedly increasing the reluctnace of said other flux path in response to an increase in the measurement to be taken; two windings respectively linking said flux paths; means for energizing said windings from a source of current of rapidly-varying potential to produce potential differences across each winding which vary with respect to each other as the relative reluctances of said flux paths change; an electric meter responsive to direction and magnitude of a potential difference across its terminals; and circuit means for impressing across said terminals of said meter a potential which is in one direction when the ratio of the potentials across said windings increases and which is of a magnitude related to the amount of increase of said ratio and for impressing across said terminals of said meter a potential which is in the opposite direction when said ratio decreases and which is of a magnitude related to the amount of this decrease in ratio.

11. In an electric measuring device, the combination of: means providing two flux paths of variable reluctance; means for increasing the reluctance of one flux path while relatedly decreasing the reluctance of the other flux path in response to a decrease in the measurement to be taken and for decreasing the reluctance of said one flux path while relatedly increasing the reluctance of said other flux path in response to an increase in the measurement to be taken; two windings respectively linking said flux paths; a first series connection for connecting said windings in series relationship; means for energizing said windings from a source of current of rapidly-varying potential to produce potential differences across each of said windings, the potential differences across said windings thus varying with respect to each other as the relative reluctances of said flux paths change; an electric meter responsive to and indicating both direction and magnitude of a potential difference across its terminals; two rectifiers; a second series connection for connecting said two rectifiers in series circuit, both rectifiers being connected to pass current in the same direction through this series circuit; means for connecting the series-connected rectifiers across the series-connected windings; and means for connecting said electric meter between said first and second series connections.

12. In an electric measuring device, the combination of: a movable element; means providing two flux paths; means for increasing the reluctance of one flux path while relatedly decreasing the reluctance of the other flux path in response to movement of said element in one direction and for decreasing the reluctance of said one flux path while relatedly increasing the reluctance of said other flux path in response to a movement of the element in an opposite direction; windings relatively linking said flux paths, the impedances of said windings normally bearing to each other a given ratio, one terminal of one of said windings being electrically common with respect to one terminal of the other of said windings; means for energizing said windings from a source of current of rapidly-varying potential to produce potential differences across each winding which vary with change in reluctance of the corresponding flux path; two asymmetrical impedances respectively connected to the remaining terminals of said windings; and a double-scale galvanometer connected to said asymmetrical impedances and to the electrically-common terminals of said windings to be directly responsive to a difference in the potentials across said windings to give an indication on one scale when the ratio of the potentials across said windings increases above normal and to give an indication on the other scale when the ratio of the potentials across said windings decreases below normal.

13. In an electric measuring device, the combination of: means providing first and second flux paths; movable means for relatedly varying the reluctances of said flux paths in a manner to increase the reluctance of the first flux path while relatedly decreasing the reluctance of the second flux path and vice versa in response to the direction and magnitude of movement of said movable means; first and second normally-balanced windings respectively linking said first and second flux paths; means for connecting said w'ndings in series relationship; means for energizing said windings to produce potential differences across said windings which vary in magnitude with respect to each other as the reluctances of said flux paths change to unbalance said windings, said windings being unbalanced in one direction when the potential across said first winding exceeds that across said second winding and being unbalanced in the other direction when the potential across said second winding exceeds that across said first winding; and means responsive to said direction of unbalance of said potentials and to the magnitude of such unbalance for indicating such unbalance directionally and magnitudinally.

RICARDO MESTAS.

CERTIFICATE OF CORRECTION.

Patent No. 2,268,956. January 6, 1942.

RICARDO MESTAS.

It is hereby certified that error appears in the printed specification of the above numbered patent requiring correction as follows: Page 2, first column, line 44, for "strangth" read --strength--; page 4, second column, lines 32 and 33, for "winding; a first series connection in said gauge body" read --winding in said gauge body; a first series connection--; page 5, first column, line 63, claim 10, for "reluctnace" read --reluctance--; and that the said Letters Patent should be read with this correction therein that the same may conform to the record of the case in the Patent Office.

Signed and sealed this 24th day of March, A. D. 1942.

(Seal)

Henry Van Arsdale,
Acting Commissioner of Patents.